(12) United States Patent
Babala et al.

(10) Patent No.: US 6,843,537 B2
(45) Date of Patent: Jan. 18, 2005

(54) HIGH RELIABILITY PRESSURE SENSOR

(75) Inventors: Mike L. Babala, Plymouth, MI (US);
Marc Bolitho, Linden, MI (US);
Jeffrey E. Shaya, Farmington Hills, MI (US); Thomas Baron, Leimbach (DE)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/363,835

(22) PCT Filed: Sep. 7, 2001

(86) PCT No.: PCT/US01/28186
§ 371 (c)(1),
(2), (4) Date: Mar. 7, 2003

(87) PCT Pub. No.: WO02/20998
PCT Pub. Date: Mar. 14, 2002

(65) Prior Publication Data
US 2004/0015282 A1 Jan. 22, 2004

Related U.S. Application Data

(63) Continuation of application No. 09/749,305, filed on Dec. 27, 2000, now Pat. No. 6,434,456.
(60) Provisional application No. 60/230,841, filed on Sep. 7, 2000.

(51) Int. Cl.$^7$ ................................................ B60T 8/88
(52) U.S. Cl. ............................ 303/122.09; 303/DIG. 1; 303/DIG. 3; 701/34
(58) Field of Search ....................... 303/155, DIG. 1, 303/DIG. 3, DIG. 4, 122.1, 122.09, 166; 701/34; 73/753, 754, 755, 756, 714

(56) References Cited

U.S. PATENT DOCUMENTS

| | | | |
|---|---|---|---|
| 4,222,277 A | * | 9/1980 | Kurtz et al. .................. 73/721 |
| 4,726,233 A | * | 2/1988 | Eckardt et al. ............... 73/727 |
| 5,193,394 A | * | 3/1993 | Suda ............................ 73/766 |
| 5,339,782 A | | 8/1994 | Golzer et al. |
| 5,427,442 A | | 6/1995 | Heibel |
| 5,709,438 A | | 1/1998 | Isakson et al. |
| 5,779,329 A | | 7/1998 | Takeshima |
| 5,951,121 A | * | 9/1999 | Takahashi ................... 303/155 |
| 5,954,406 A | | 9/1999 | Sawada |
| 6,109,703 A | * | 8/2000 | Takahashi ................... 303/155 |
| 6,122,577 A | | 9/2000 | Mergenthaler et al. |
| 6,209,399 B1 | * | 4/2001 | Probst et al. ................. 73/706 |
| 6,312,061 B1 | | 11/2001 | Schliebe et al. |
| 6,382,738 B1 | * | 5/2002 | Bayer et al. ............. 303/119.2 |
| 6,434,456 B1 | | 8/2002 | Babala et al. |
| 6,484,816 B1 | * | 11/2002 | Koederitz .................... 175/25 |
| 6,643,976 B2 | * | 11/2003 | Ante et al. .................... 73/715 |
| 6,678,593 B2 | * | 1/2004 | Kachel et al. ................ 701/34 |

FOREIGN PATENT DOCUMENTS

DE      199 07 338 A1     5/2000

* cited by examiner

Primary Examiner—Matthew C. Graham
Assistant Examiner—Mariano Sy
(74) Attorney, Agent, or Firm—MacMillan, Sobanski & Todd, LLC (57) ABSTRACT

The reliability of a pressure sensor is improved either by utilization of redundant components. A pair of pressure sensors are mounted upon a single pressure sensor diaphragm. Each of the pressure sensors is connected to one of a pair of signal conditioning circuits. The gain of one of the signal conditioning circuits is a fraction of the gain of the other signal conditioning circuit. The outputs of each of the signal conditioning circuits are compared to a corresponding threshold. If both of the output signals exceed the corresponding threshold, it is determined that a malfunction of the pressure sensor has occured.

28 Claims, 12 Drawing Sheets

HIGH RELIABILITY PRESSURE SENSOR

CROSS REFERENCE TO RELATED APPLICATIONS

This application claims the benefit of PCT Patent Application Ser. No. PCT/US 01/28186 filed Sep. 7, 2001, which is a continuation of U.S. patent application Ser. No. 09/749,305 filed Dec. 27, 2000, now U.S. Pat. No. 6,434,546, and U.S. Provisional Application Ser. No. 60/230,841, filed Sep. 7, 2000.

BACKGROUND OF THE INVENTION

This invention relates in general to pressure sensors used in hydraulic control systems and in particular to a high reliability pressure sensor utilized in a vehicle brake system with Hydraulic Brake Assist.

Recently, Hydraulic Brake Assist (HBA) has been included on new vehicles. HBA provides maximum braking capability during an emergency braking situation. During a braking cycle, the brake pressure is sensed to determine if an emergency situation has occurred. Alternately, the magnitude of the brake pedal stroke and speed of brake pedal movement can be monitored for an emergency braking situation. Typically, an emergency is identified by a certain pedal-application speed occurring along with a minimum level of brake-pedal force. Thus, a quick, deep stab at the brake pedal activates HBA while a quick shallow stab, as to cancel cruise control, or a slow but deep pedal application, as when slowing for a curve, will not activate HBA.

Figure 1:
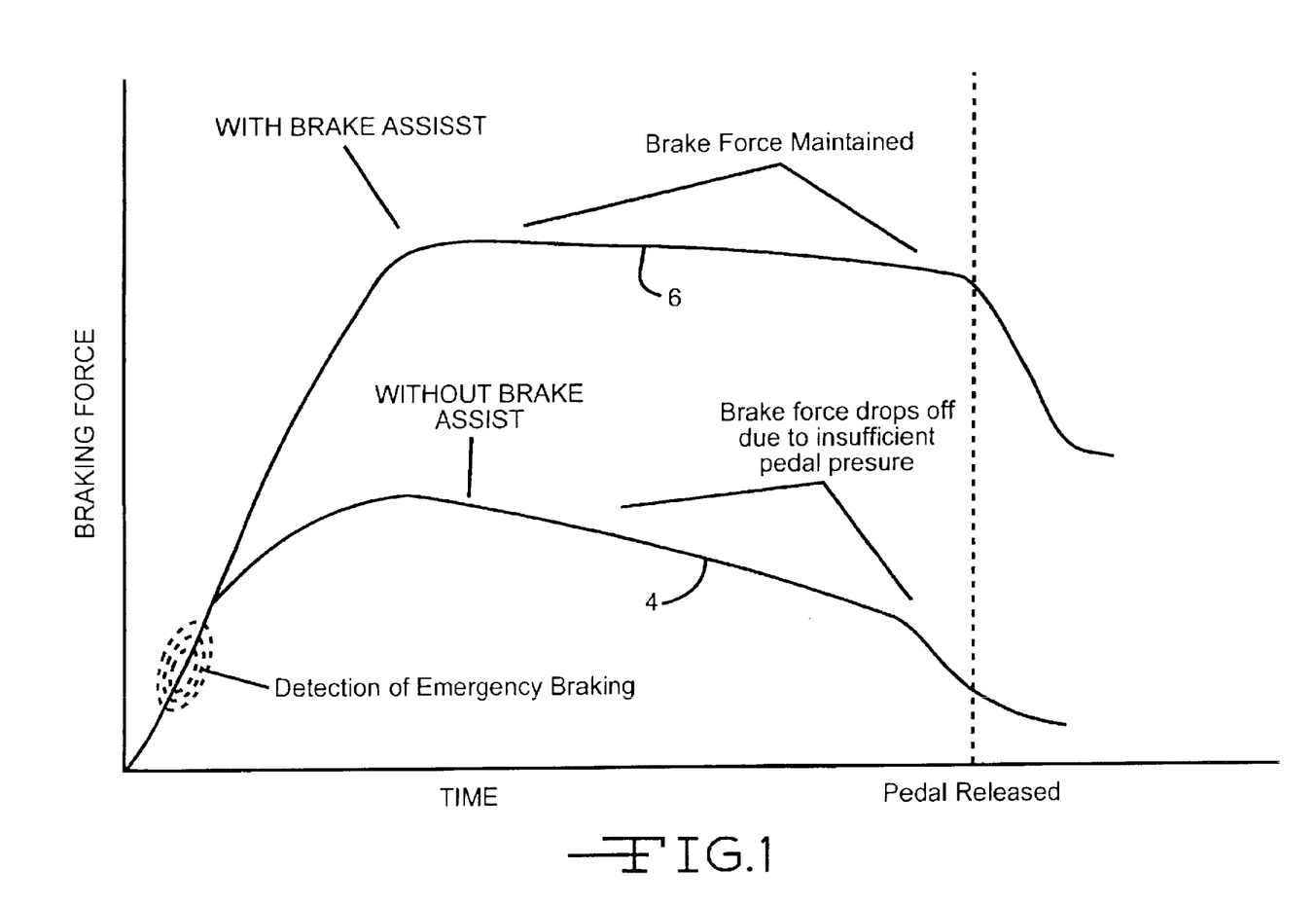
FIG. 1 is a plot of braking force vs. time that illustrates the operation of Hydraulic Brake Assist.

Upon detection of an emergency braking situation, HBA increases brake application pressure to a maximum value and continues to hold the maximum pressure until the vehicle stops or the brake pedal is released, as illustrated in FIG. 1. In FIG. 1, vehicle braking force is plotted as a function of time. The lower curve, which is labeled 4, is for a brake system without HBA, while the upper curve, which is labeled 6, is for a brake system that includes HBA. Typically, during an emergency braking situation, the vehicle operator partially lifts his foot from the brake pedal following his initial quick, deep stab. Thus, HBA assures that the brakes remain applied with maximum force.

There are a number of known methods for integrating HBA with a vehicle brake system. One method is completely mechanical and involves modification of the vacuum brake booster to provide HBA. Another method is to include the HBA function in an Anti-lock Brake System (ABS). An ABS is often included in many vehicles to prevent wheel lock up during stops upon low mu road surfaces. Such systems detect excessive slippage of one or more controlled wheels and selectively reduce and reapply the pressure applied to the controlled wheel brakes to reduce the slippage and thereby avoid a potential locking-up of the wheel.

Figure 2:
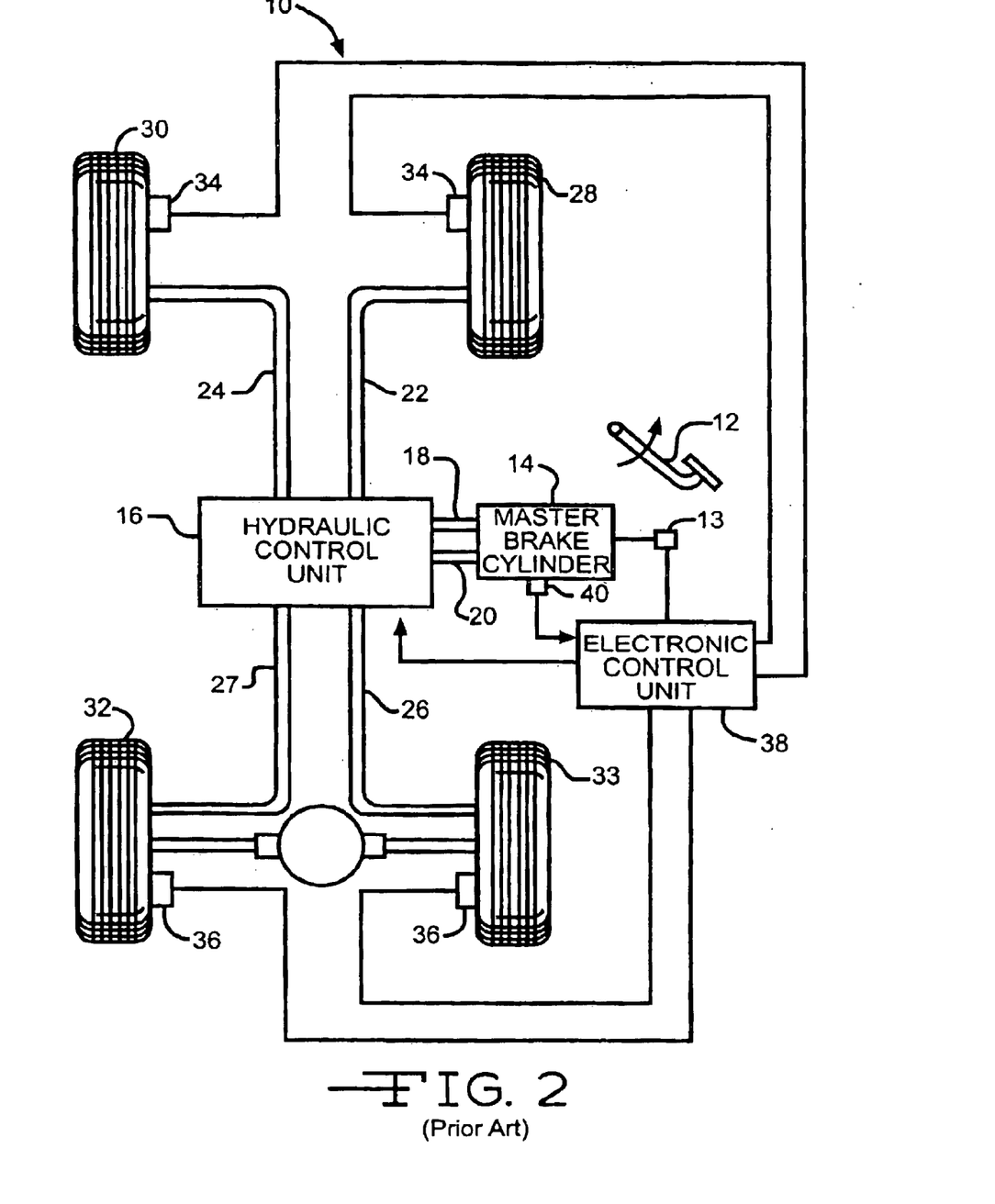
FIG. 2 is a schematic diagram of a brake control system in accordance with the prior art that includes Hydraulic Brake Assist.

Referring again to the drawings, there is illustrated in FIG. 2, a typical brake control system 10 which has HBA included in an Anti-lock Brake System (ABS). The brake control system 10 is intended to be exemplary and it will be appreciated that there are other brake control systems having different architecture than shown. In FIG. 2, a brake pedal 12 is mechanically coupled (not shown) to a brake light switch 13 and a dual reservoir master cylinder 14. The master cylinder 14 is connected to a hydraulic control unit 16 by a pair of hydraulic lines 18 and 20. The hydraulic control unit 16 includes a plurality of solenoid valves to control the brake pressure applied to the individual wheel brakes. The control unit 16 also typically includes a source of pressurized hydraulic fluid, such as a pump driven by an electric motor. The control unit 16 is connected via hydraulic lines 22, 24, 26 and 27 to individual wheel brakes (not shown) for the front wheels 28 and 30 and the rear wheels 32 and 33. Typically, the brake circuit is diagonally split with one master cylinder reservoir controlling the brakes associated with the left front wheel 30 and right rear wheel 33 and the other master cylinder reservoir controlling the brakes associated with the right front wheel 28 and the left rear wheel 32.

The brake control system 10 also includes a pair of front wheel speed sensors 34 that generate signals that are proportional to the speed of the front wheels 28 and 30 and a pair of rear wheel speed sensors 36 that generate signals that are proportional to the speed of the rear wheels 32 and 33. The wheel speed sensors 34 and 36 and the stop light switch 13 are electrically connected to an Electronic Control Unit (ECU) 38. The control unit 38 includes a microprocessor (not shown), that, under the control of an algorithm, selectively actuates the solenoid valves and pump in the control unit 16 to correct excessive wheel slippage.

The brake control system 10 further includes a pressure sensor 40 that monitors the hydraulic pressure in one of the master cylinder reservoirs. An pressure signal is supplied to the ECU 38. The microprocessor monitors the pressure signal and responsive thereto, upon detecting an emergency brake application, to actuate HBA.

Figure 3:
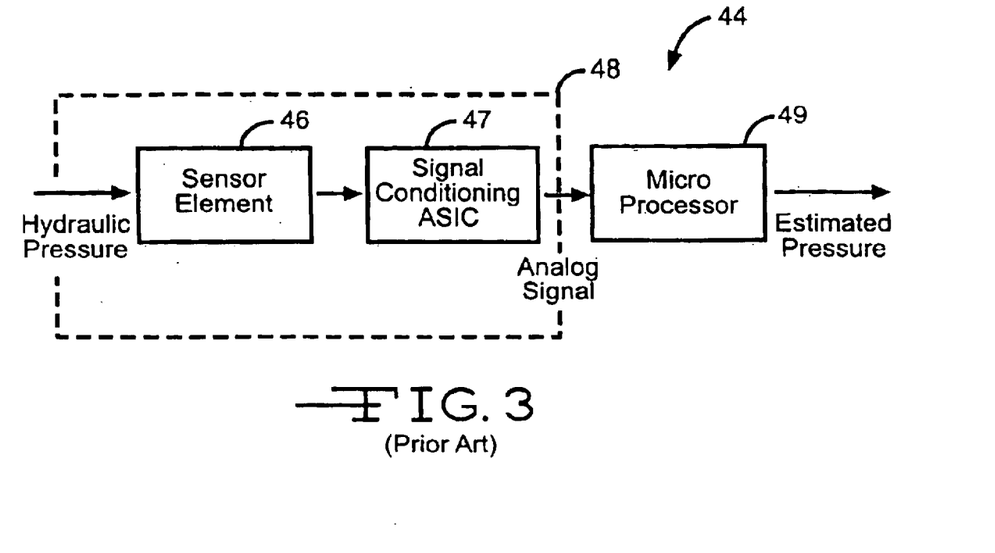
FIG. 3 is a schematic diagram of a pressure sensor that is included in the brake control system shown in FIG. 2.

A typical prior art pressure sensor assembly is illustrated generally at 44 in FIG. 3. The pressure sensor assembly includes a sensor element 46 that is electrically coupled to an Application Specific Integrated Circuit (ASIC) 47. Hydraulic pressure is applied to the sensor element 46. Both the sensor element 46 and the ASIC 47 are typically mounted in a common housing, that is shown schematically by the dashed line labeled 48 in FIG. 3. The sensor element 46 may include a plurality of strain gauges mounted upon one side of a thin diaphragm. The diaphragm is usually a disc formed from stainless steel. The strain gauges are typically arranged as a conventional half or full bridge circuit, such as, for example, a conventional thin film Wheatstone Bridge. The hydraulic brake fluid in the brake system is in contact with the side of the diaphragm opposite from the strain gauges. When the vehicle brakes are applied, the hydraulic brake fluid is pressurized and causes the diaphragm to deflect from its rest position. As the diaphragm is deflected by the applied pressure, the strain gauges are stretched or compressed, causing a change in the internal resistance of the gauges. The changed resistances result in a voltage appearing across the bridge circuit that is proportional to the magnitude of the pressure. The voltage is conditioned by the ASIC 47. The ASIC 47 generates an analog or digital pressure signal that is applied to an input port of an ECU microprocessor 49. The microprocessor 49 is included in the vehicle brake control system 10.

SUMMARY OF THE INVENTION

This invention relates to a high reliability pressure sensor utilized in a vehicle brake system with Hydraulic Brake Assist.

As explained above, current HBA systems include a pressure sensor to detect an emergency stop condition. However, if the pressure sensor should malfunction or fail, it is possible that a false emergency stop signal may be generated that would trigger the HBA. It is known to improve HBA system reliability by including a second complete pressure sensor to provide a redundant pressure signal to the ECU microprocessor. The ECU microprocessor compares the two signals and, if the signals are different, it is assumed that one of the pressure sensors is malfunctioning and the HBA is disabled. However, the inclusion of two complete pressure sensors is both bulky and expensive. Two pressure sensors also require two ports in the hydraulic control unit which increases the potential for hydraulic fluid leakage. Accordingly, it would be desirable to improve the reliability of the measurement of the brake pressure in a HBA system without requiring two separate pressure sensors.

The present invention contemplates a pressure sensor assembly for a hydraulic control unit that includes a pressure sensor housing adapted to be mounted upon a hydraulic control unit and a pressure sensor diaphragm carried by the housing. First and second pressure sensing elements are mounted upon the pressure sensor diaphragm. A first signal conditioning circuit is connected to the first pressure sensing element and a second signal conditioning circuit is connected to the second pressure sensing element The said first and second signal conditioning circuits are operable to generate first and second pressure signals at output ports. An active electronic device is connected to the output ports of the first and second signal conditioning circuits and is operative to compare the first and second pressure signals. In the preferred embodiment, the active electronic device includes a microprocessor; however, other devices, such as, for example, a comparator circuit also can be used. Upon detecting a difference between the pressure signals the electronic device generates an error signal. The error signal can be generated when the difference between the pressure signals is non-zero or when the difference exceeds a predetermined threshold In the preferred embodiment, the pressure sensor assembly is included in a hydraulic brake assist system and the electronic device is further operable to disable the hydraulic brake assist system upon generating the error signal. The first and second signal conditioning circuits can be separate electronic components or can be included in a single electronic component.

Alternately, the two pressure sensing elements can be connected to a single signal conditioning circuit. The signal conditioning circuit is operable to generate a digital pressure signal which includes pressure data from both of the pressure sensing elements. In the preferred embodiment, the digital pressure signal is time multiplexed. Additionally, the pressure sensor assembly can include a temperature sensor with the digital signal generated by the signal conditioning circuit including temperature data.

It is further contemplated that the pressure sensor assembly includes a single pressure sensing element connected to a signal conditioning circuit. The signal conditioning circuit being operative to generate a pressure signal. The signal conditioning circuit also includes at least one diagnostic test and is operable to generate an error signal upon detecting a predetermined fault condition. Furthermore, the associated active electronic device also can include at least one diagnostic test and be operative to generate an error signal upon detection of a predetermined fault condition. Additionally, the active electronic device can be adapted to receive operating data from at least one vehicle component and to include the vehicle parameter data in the diagnostic test.

The present invention also contemplates a method for measuring a pressure that includes providing a pressure sensor having first and second sensor elements. The first and second sensor elements are connected to corresponding first and second signal conditioning circuits with the second signal conditioning circuit having a gain that is a fraction of the gain of the first signal conditioning circuit. The output of the first signal conditioning circuit is compared to a first threshold. Upon the output of the first signal conditioning circuit exceeding the first threshold, the output of the second signal conditioning circuit is compared to a second threshold, and if the output of the second signal conditioning circuit exceeds the second threshold, an error flag is set.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 4:
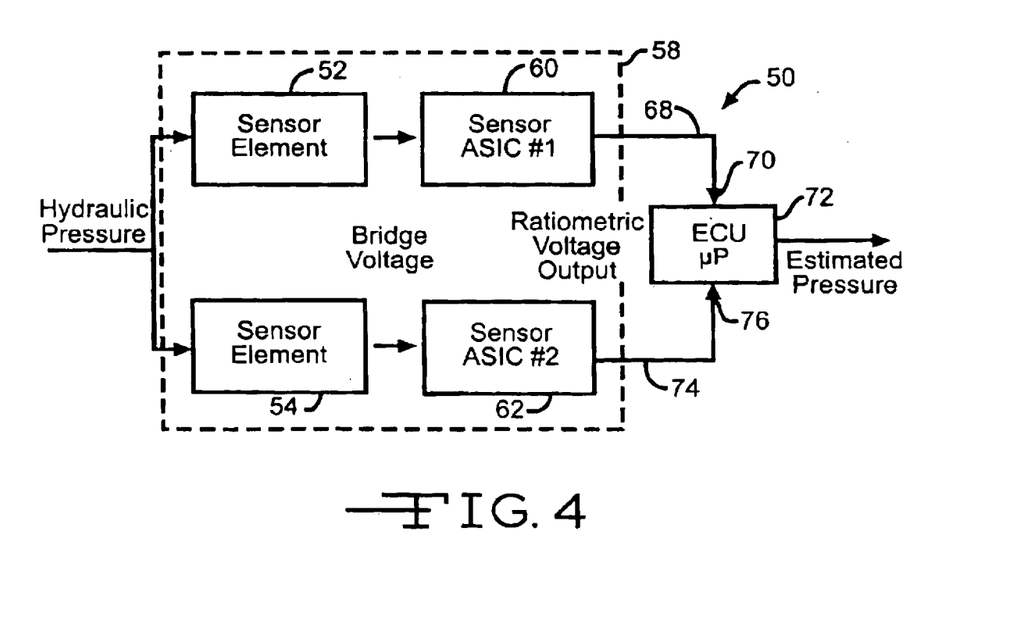
FIG. 4 is a schematic diagram of a pressure sensor for the brake control system shown in FIG. 2 that is in accordance with the present invention.
Figure 5:
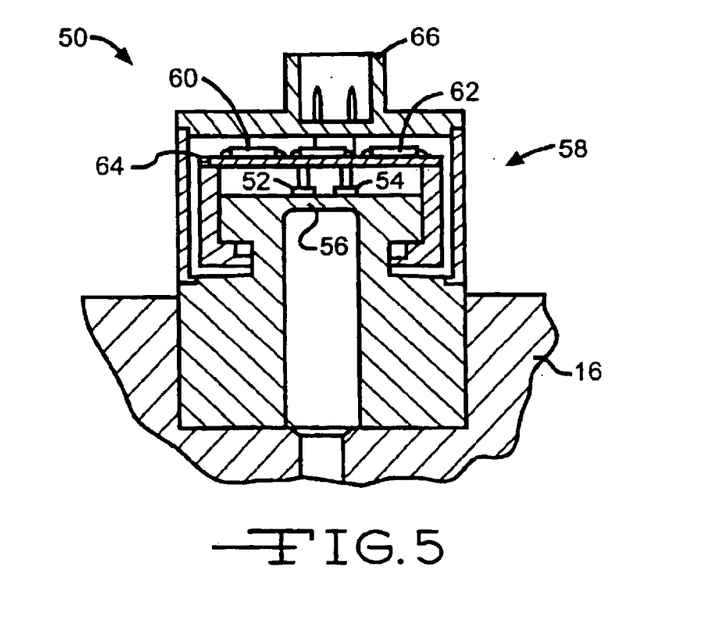
FIG. 5 is a sectional view of the pressure sensor shown in FIG. 4.

Referring once more to the drawings, there is shown at 50 in FIG. 4, a schematic diagram for an improved pressure sensor that increases HBA system reliability by providing redundancy in a single pressure sensor assembly. As best seen in FIG. 5, the present invention contemplates placing two separate conventional sensor elements 52 and 54 upon a single thin diaphragm 56 within a single pressure sensor housing 58. It will be appreciated that the pressure sensor structure shown in FIG. 5 is meant to be exemplary. The pressure sensor also can be configured differently than shown in FIG. 5, such as, for example, pressure sensor elements can be glued to a surface of a cavity that is then filled with a transfer fluid (not shown). A thin diaphragm would separate the transfer fluid from the brake fluid. Any change in brake fluid pressure would be trnsmitted through the diaphragm to the transfer fluid. Changes in transfer fluid pressure would be detected by the pressure sensor elements. However, two sets of pressure sensor elements would be included in the cavity. As also shown in FIG. 5, the pressure sensing housing 58 is mounted upon a Hydraulic Control Unit (HCU) 16; however, it will be appreciated that the pressure sensor also can be integrally mounted within the HCU 16 not shown). Each of the sensor elements 52 and 54 generates a bridge voltage that is applied to an input port of an associated sensor ASIC 60 and 62 mounted upon a Printed Circuit Board (PCB) 64.

As shown in FIG. 4, the first ASIC 60 conditions the bridge voltage generated by the associated sensor element 52 to obtain a first analog pressure output signal while the second ASIC 62 conditions the bridge voltage generated by the associated sensor element 54 to obtain a second analog pressure output signal. The first conditioned output pressure signal is supplied through an electrical connector 66 and over a first analog signal line 68 to a corresponding pressure input port 70 of an ECU microprocessor 72. Similarly, the second conditioned output pressure signal is supplied through the electrical connector 66 and over a second analog signal line 74 to a corresponding pressure input port 76 of the ECU microprocessor 72. Alternately, the ASIC's 60 and 62 can generate digital pressure output signals, in which case a digital signal line would connect the each of the ASIC's to the microprocessor 72. Additionally, in the preferred embodiment, the connector 66 includes contacts for power supply and ground connections (not shown).

The ECU microprocessor 72 compares the two output pressure signals, and, if the signals are different, determines that the sensor assembly 50 has malfunctioned. Upon determination that the sensor assembly 50 has malfunctioned, the microprocessor 72 disables the HBA and generates a warning signal for the vehicle operator. In the preferred embodiment, the warning signal consists of illuminating a light on the vehicle dashboard (not shown). The invention contemplates using one of two modes of operation for the microprocessor test comparison. In the first mode, the microprocessor 72 determines that a malfunction has occurred if the two pressure signals are not identical, that is, the difference between the two pressure signals is non-zero. Alternately, the microprocessor 72 can determine that a malfunction has occurred if the difference between the two pressure signals is greater than a predetermined threshold. As long as the difference between the pressure signals is within the allowable range, the microprocessor 72 accepts the pressure signal data as correct and generates a digital estimated pressure signal.

In the preferred embodiment, the microprocessor 72 is continually monitoring the two pressure signals while the vehicle is being operated. Thus, the pressure sensor 50 shown in FIGS. 4 and 5 provides physical redundancy by including two sensor elements, 52 and 54, two ASIC's, 60 and 62, and two analog signal transmission lines, 68 and 74.

Figure 6:
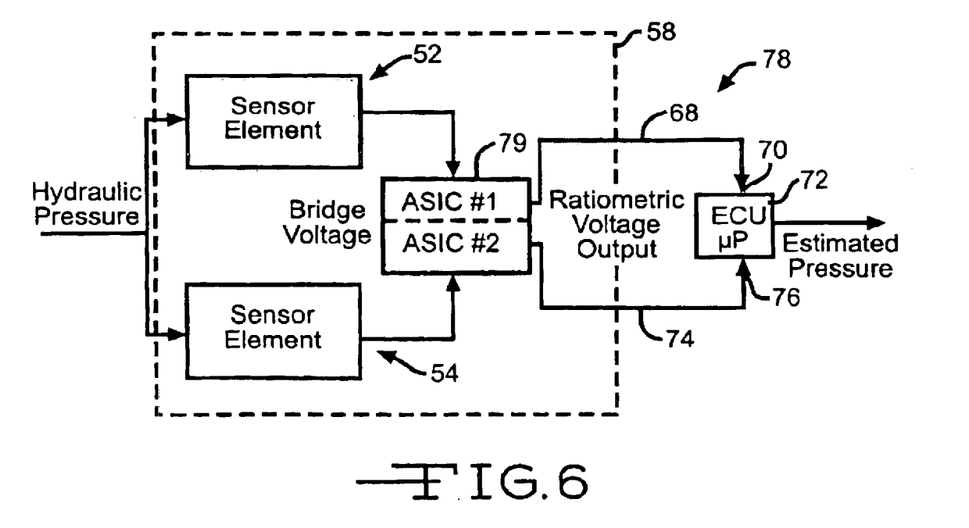
FIG. 6 is a schematic diagram of an alternate embodiment of the pressure sensor shown in FIG. 2.

The invention also contemplates an alternate structure for providing increased HBA system reliability with a single pressure sensor assembly for a HBA, as shown generally at 78 in FIG. 6. Components in FIG. 6 that are similar to components shown in FIG. 4 have the same numerical designators. Similar to the previous pressure sensor 50, the alternate structure 78 includes two pressure sensing elements 52 and 54 mounted upon a single pressure sensor diaphragm. Each of the sensor elements 52 and 54 generates a bridge voltage that is applied to a corresponding input port of a single chip 79 mounted upon the Printed Circuit Board (PCB) 64 (not shown). The chip 79 is formed to include two separate ASIC portions, that are labeled ASCI #1 and ASCI #2 in FIG. 6. Each of the ASIC portions conditions the bridge voltage of one of the sensor elements 52 and 54 to obtain two analog pressure output signals. As described above, the two conditioned output pressure signals are supplied through an electrical connector 66 over two analog lines 68 and 74 to two corresponding pressure input ports 70 and 76 of the ECU microprocessor 72. By combining the two ASIC's into a single chip, the number of components is reduced while the redundancy of the sensor elements 42 and 54 and transmission lines 68 and 74 is maintained. As described above, the microprocessor 72 compares the two analog pressure signals to determine if the pressure sensor is functioning properly.

Figure 7:
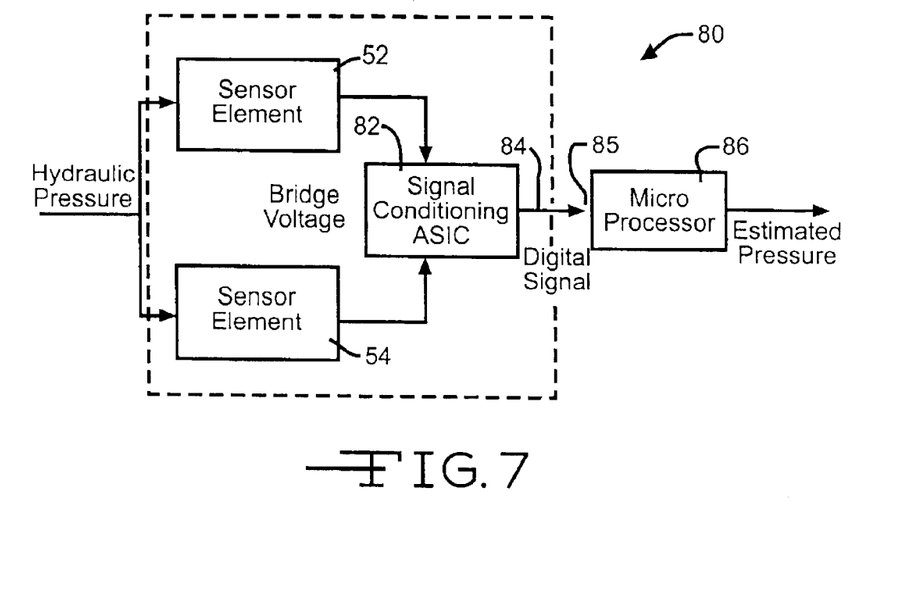
FIG. 7 is a schematic diagram of another alternate embodiment of the pressure sensor shown in FIG. 2.

The invention also contemplates a second alternate structure for providing increased HBA system reliability with a single pressure sensor assembly for a HBA, as shown generally at 80 in FIG. 7. Components in FIG. 7 that are similar to components shown in FIG. 4 have the same numerical designators. Similar to the previously described system 50, the alternate system 80 includes two pressure sensing elements 52 and 54 mounted upon a single pressure sensor diaphragm. However, the bridge voltages generated by the two sensing elements 52 and 54 are applied to input ports of a single signal conditioning ASIC 82. The ASIC 82 digitizes and conditions the bridge voltages. The digitized pressure signals are combined into a time-multiplexed signal and transmitted over a single transmission line 84 to a single pressure input port 85 of an ECU microprocessor 86.

The microprocessor 86 compares the pressure signals and if the difference between the signals is greater than a predetermined threshold, the microprocessor 86 generates an error signal and disables the HBA. Upon the HBA being disabled, a HBA failure indicator is illuminated to warn the vehicle operator. In the preferred embodiment, the pressure signals are transmitted every 3 milliseconds; however, other transmission time periods may be used. Additionally, the invention contemplates that the brake fluid temperature is also sensed and transmitted to the microprocessor 86; however, the temperature sensing is optional. The use of a time-multiplexed signal allows a two-wire connection between the sensor and the microprocessor 86 with current switching similar to an active wheel sensor. In the preferred embodiment, the pressure sensor 80 is compatible with a 100K baud universal asynchronous receiver/transmitter line. Furthermore, as an option, the ASCI 82 can be programmed to periodically send manufacturer's calibration data and serial number to the ECU. This is contemplated as being done less frequently than the pressure and temperature data transmittal, such as, for example at one second intervals.

Figure 8:
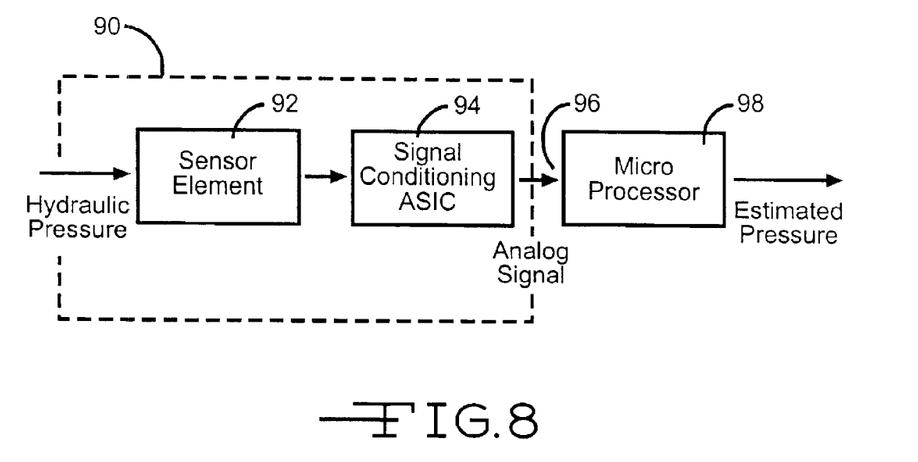
FIG. 8 is a schematic diagram of another alternate embodiment of the pressure sensor shown in FIG. 2.

The invention further contemplates a third alternate structure for providing increased HBA system reliability in a single pressure sensor assembly for a HBA, as shown generally at 90 in FIG. 8. The pressure sensor 90 has a single pressure sensor element 92 and a single sensor signal conditioning ASIC 94. The ASIC 94 generates an analog pressure signal that is applied to a single pressure input port 96 of an ECU microprocessor 98. The ASIC 94 is programmed to apply diagnostic tests itself and to the bridge voltage generated by the sensor 90. Upon detecting an improper operating condition, the sensor ASIC 94 will generate an error signal to cause the ECU microprocessor 98 to disable the HBA. Additionally, the ECU microprocessor 98 continuously applies diagnostic tests to the pressure signal received from the sensor ASIC 94. Upon detecting a signal which is outside of an allowable operating range, the microprocessor 98 generates an error signal and disables the HBA. Upon disabling the HBA, the microprocessor 98 also illuminates a warning light to inform the vehicle operator of the problem.

A typical diagnostic tests will be described next. In the preferred embodiment, a regulated voltage supply supplies power to the pressure sensor and the bridge circuit output voltage is within the range that is greater than zero but less than the supply voltage. Thus, one of the diagnostic tests can include continuously monitoring the bridge output voltage to determine if the bridge output voltage is outside of the expected voltage range. For example, a determination that the bridge voltage is zero is an indication of a possible short circuit in the bridge while a voltage that is equal to the supply voltage is an indication of a possible open circuit in the bridge circuit. Upon encountering one of these conditions, the ASIC 94 would generate an error signal. The microprocessor 98 would be responsive to the error signal to disable the HBA.

The invention also contemplates that the diagnostic tests could determine in-range failures, that is failures that could occur with the bridge output voltage remaining within the allowable bridge output voltage range. Thus, if the diagnostics detect an output voltage reading indicating an increased pressure that has an unusually long duration, the diagnostic tests determine that the sensor assembly 90 has failed and the HBA is disabled. Accordingly, the ASIC 94 would generate an error signal.

The present invention also contemplates that diagnostic tests can be included in the ECU microprocessor 98. It is further contemplated that the microprocessor 98 can set different fault flags to aid a technician in determining the specific cause of the fault. The tests also can correlate with external conditions, such as, for example, whether or not the vehicle brakes are applied. Thus, an increased pressure reading that occurs without the vehicle brakes being applied is an indication that the sensor 90 has probably failed.

It will be appreciated that the above described diagnostic tests are intended to be exemplary and that the invention also can be practiced with other specific diagnostic tests. The replacement of two complete pressure sensors with one allows a corresponding reduction of the overall size of the hydraulic control unit. Furthermore, with the continuing miniaturization and reduction of costs for the associated ASCI's, it is expected that the present invention will also result in reduced costs manufacturing costs for the HBA system. The inventors believe that sufficient tests can be developed to assure that the level of reliability required for single sensor 90 to be utilized in a HBA can be achieved.

Figure 9:
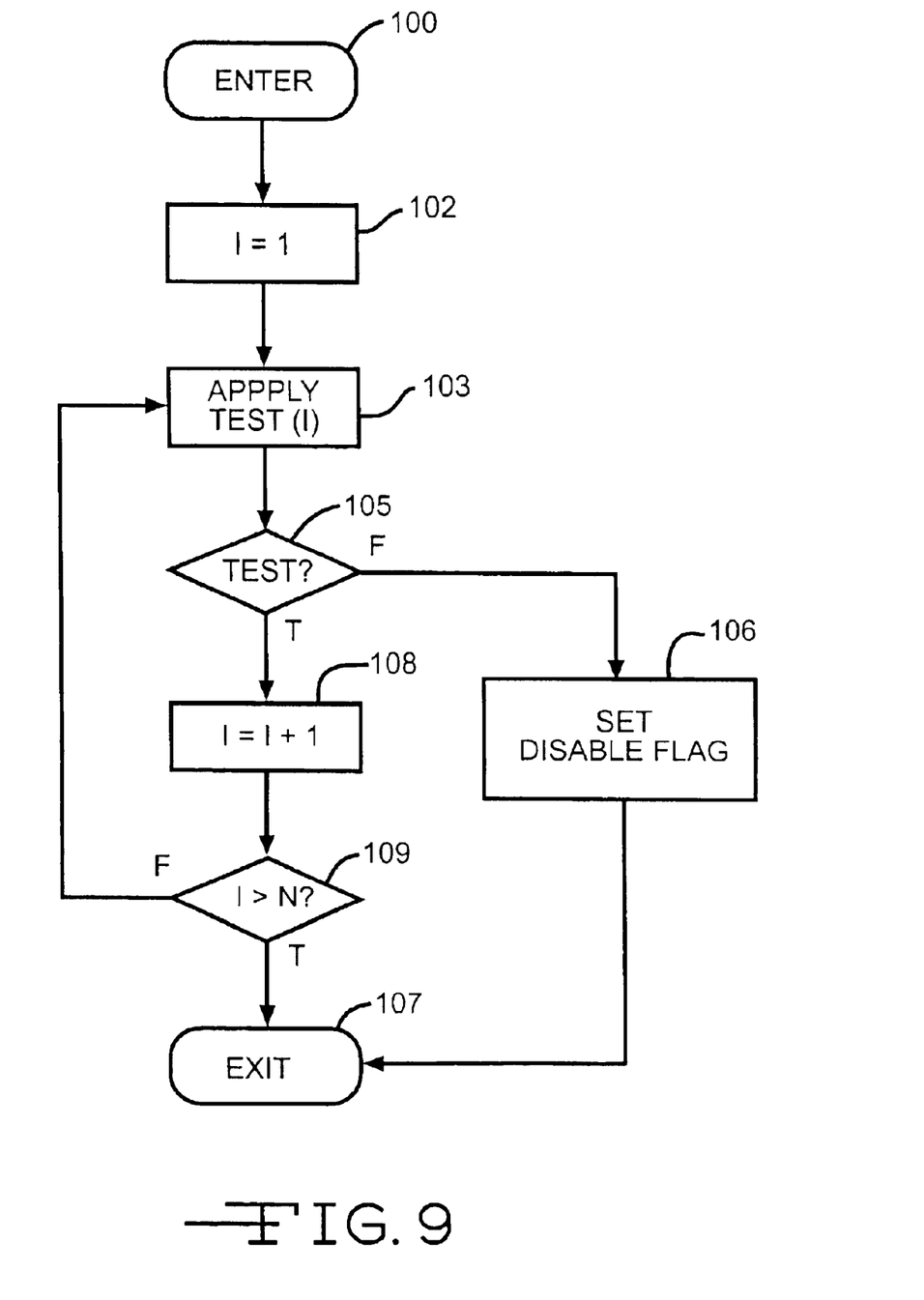
FIG. 9 is a flow chart for an algorithm for the operation of the pressure sensor illustrated in FIG. 8.

A flow chart for a testing algorithm that includes N diagnostic tests is illustrated in FIG. 9. It is contemplated that the algorithm would be included as a subroutine in the ABS control algorithm. The algorithm is called periodically by the main control algorithm and entered through block 100. An index I is initialized as one in functional block 102. In functional block 103, diagnostic test (I) is performed. For example, the current output voltage of the sensor bridge circuit is measured. The results of diagnostic test (I) are compared to the test criteria in decision block 105. For example, is the bridge output voltage equal to zero? If the test criteria is not met, that is, there is a FALSE finding, the subroutine transfers to functional block 106 where a disable flag is set and then exits back to the main control algorithm through block 107. If the test criteria is met in decision block 105, that is, there is a TRUE finding, the subroutine transfers to functional block 108 where the value of I is indexed by one. The new value of I is compared to the total number of diagnostic tests, N, in decision block 109. If I is less than or equal to N, all N tests have not been performed and the subroutine returns to functional block 103 to apply the next diagnostic test, such as, for example, is the bridge output voltage equal to the regulated supply voltage? If I is greater than N in decision block 109, all tests have been run and the subroutine exits back to the main control algorithm through block 107. As described above, the test criteria can include parameters determined from other vehicle components, such as, for example, are the vehicle brakes applied? Thus, an alternate embodiment of the algorithm shown in FIG. 9 would include sampling the other vehicle parameters (not shown).

For an analog pressure sensor using inexpensive available electronics for signal processing, both overpressure and sensor failure may cause the output of the signal processing electronics for the pressure sensor to go to a saturation voltage, $V_{cc}$. Since overpressure conditions are to be expected, it is possible that the software would misinterpret the saturation voltage as a sensor failure and latch an error code. Accordingly, the invention further contemplates a technique for determining whether the pressure sensor is experiencing a temporary overpressure condition or has actually failed.

The present invention contemplates using different gains for the signal processing electronics associated for each of the sensor elements. Thus, for the sensor configuration illustrated in FIG. 4, the second sensor ASIC 62 would have a gain that is significantly less than the gain for the first sensor ASIC 60. For illustrative purposes, the gain of the second ASIC 62 is assumed to be one third of the gain of the first ASIC 60; however, it will be appreciated that the invention also can be practiced with other values. Thus, during an overpressure condition, the second ASIC 62 would show the true value of the pressure while the first ASIC 60 would saturate. The difference in the output readings would be interpreted by the software as a overpressure condition and the software would not latch an error code. Likewise, if both outputs saturate, the readings would be interpreted by the software as a sensor failure and the software would latch an error code.

Figure 10:
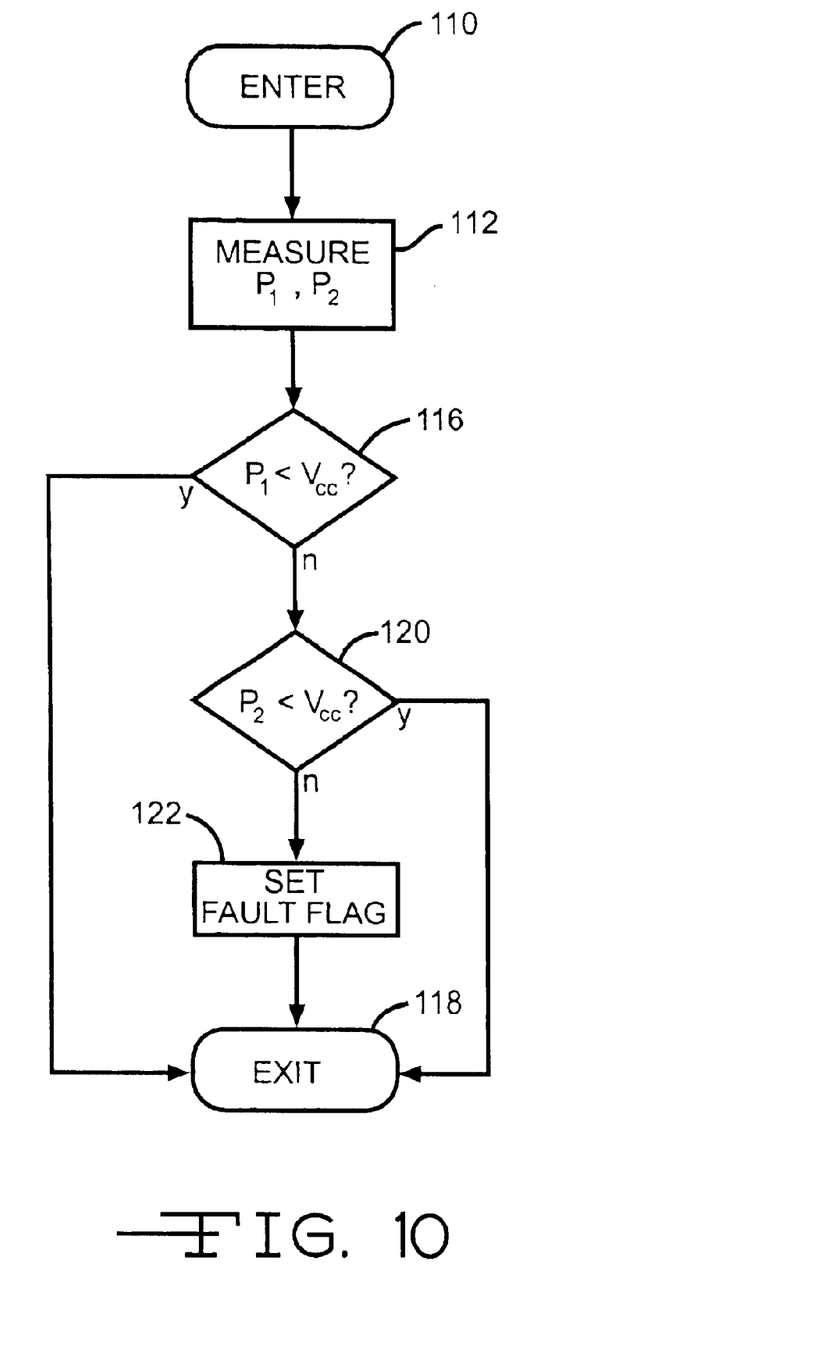
FIG. 10 is a flow chart for a method for failure detection of the pressure sensor shown in FIG. 4.

The technique would be implemented by a subroutine that is illustrated by the flow chart shown in FIG. 10. The subroutine is entered through block 110. The pressures being sensed by the sensor elements 52 and 54 are measured in functional block 112. In decision block 116, the output of the first ASIC 60 that is associated with the first sensor element 52, and indicated by $P_1$, is compared to the saturation voltage $V_{cc}$. If the output $P_1$ is less than the saturation voltage $V_{cc}$, the subroutine returns to the main algorithm through the exit block 118. If the output $P_1$ is equal to the saturation voltage $V_{cc}$, the subroutine continues to decision block 120 where the output of the second ASIC 62 that is associated with the second sensor element 54, and indicated by $P_2$, is compared to the saturation voltage $V_{cc}$. If the output $P_2$ is less than the saturation voltage $V_{cc}$, the subroutine returns to the main algorithm through the exit block 118. If the output $P_2$ is equal to the saturation voltage $V_{cc}$, the subroutine continues to functional block 122 where a fault flag is set. The subroutine then exits back to the main algorithm through the exit block 118.

Figure 11:
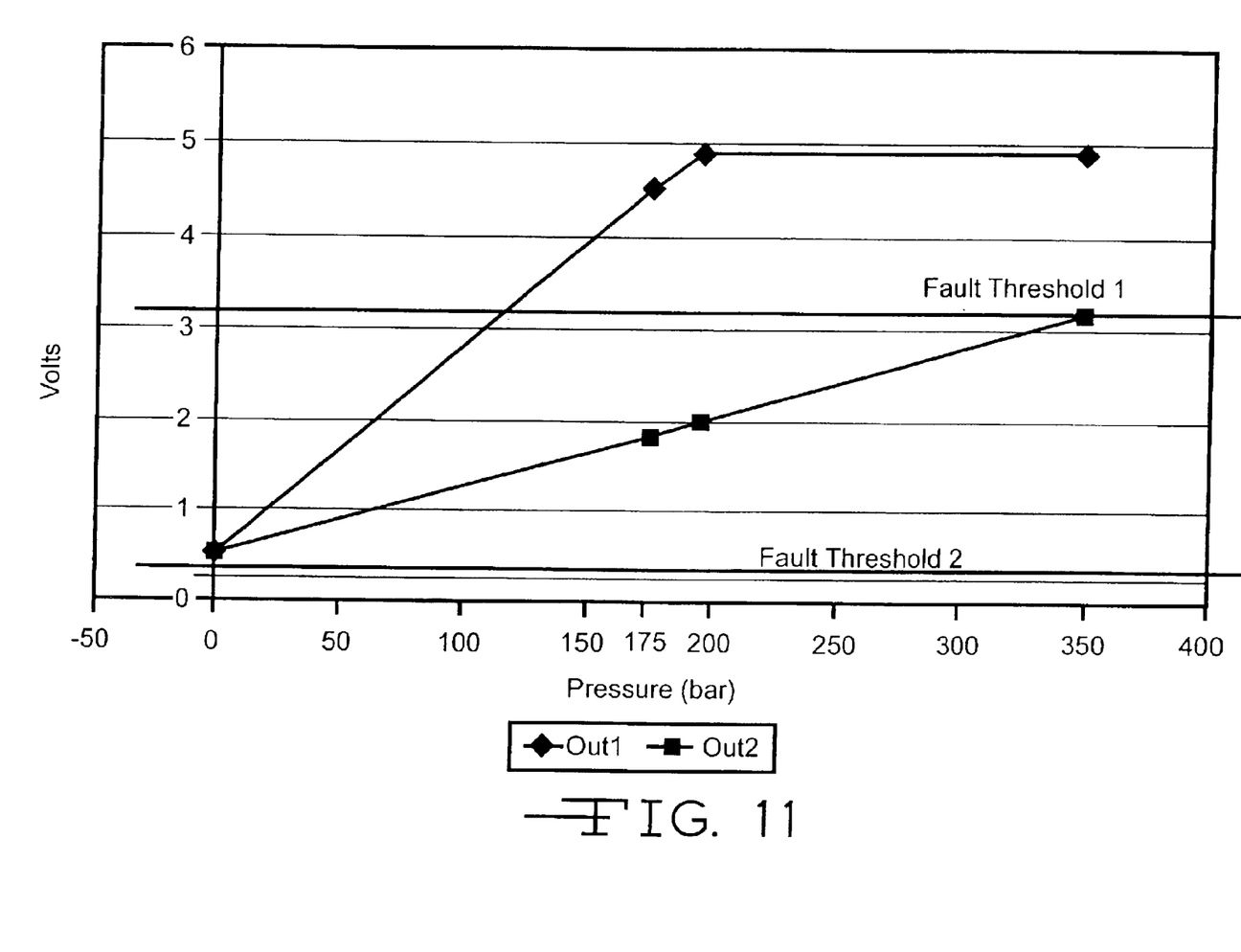
FIG. 11 is a graph of voltage vs. pressure that illustrates a method for failure detection of the pressure sensor shown in FIG. 4.
Figure 12:
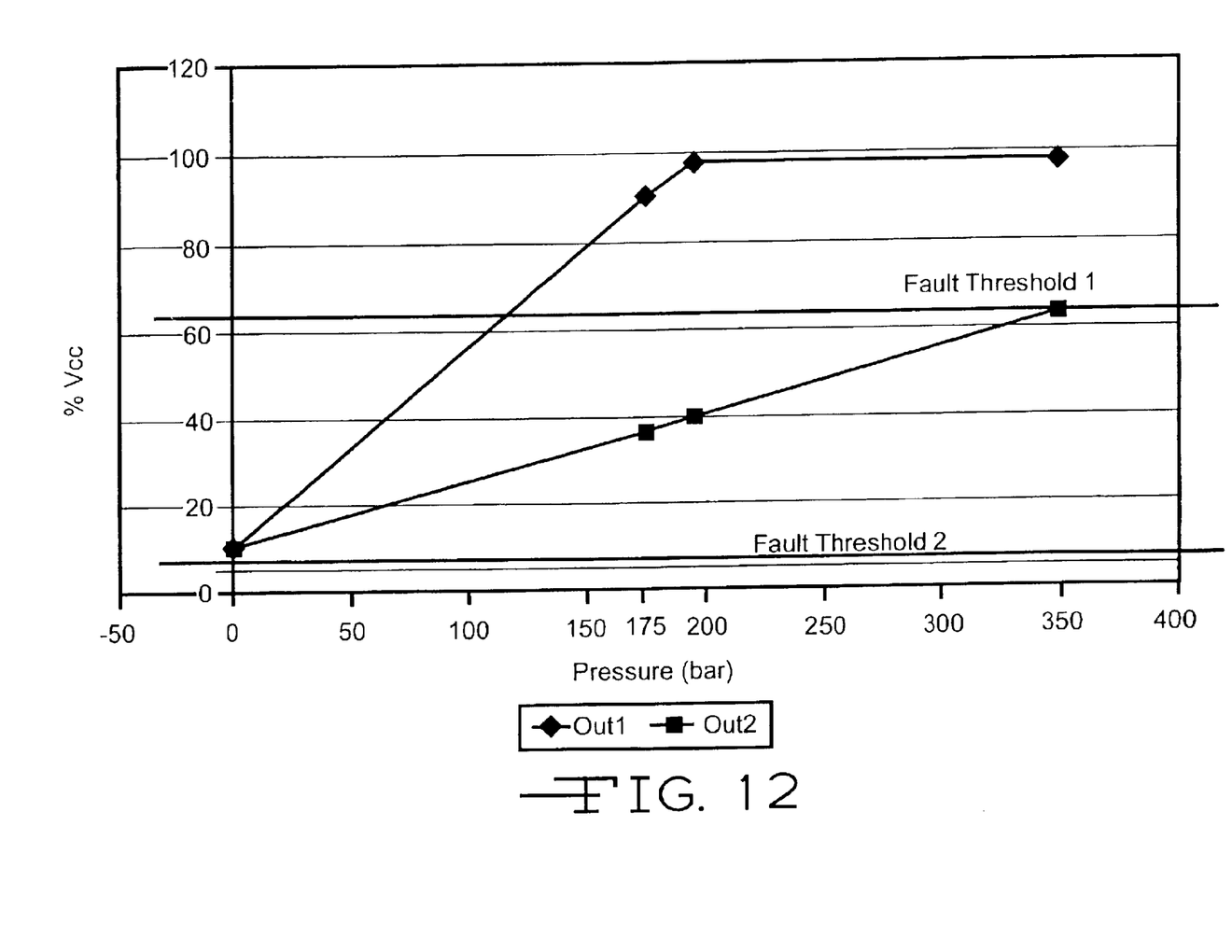
FIG. 12 is a graph of percent of saturation voltage vs. pressure that illustrates a method for failure detection of the pressure sensor shown in FIG. 4.

The invention also contemplates an alternate embodiment that utilizes a first threshold voltage, $T_1$, that is established as a maximum limit for the output of the second ASIC 62, as illustrated in FIG. 11. In FIG. 11, the saturation voltage $V_{cc}$ is shown as being approximately five volts and the first threshold $T_1$ for the second ASIC 62 is shown as being slightly more than three volts. The first fault threshold $T_1$ is also illustrated in FIG. 12 as a percentage of $V_{cc}$. Additionally, if the sensor is operating properly, a minimum voltage will always be present at the output of the signal conditioning electronics. Below the minimum voltage exists a second fault threshold $T_2$ that is shown in FIGS. 11 and 12. The second threshold $T_2$ would be a fraction of a volt and would be determined by the specific components used in the signal processing electronics. Thus, when the pressure sensor is operating properly, the output of the first ASIC 60 would have to be between $T_2$ and $V_{cc}$ and the output of the second ASIC 62 would have to remain between $T_1$ and $T_2$ at all times, including when the output of the first ASIC 60 saturates. Should the output of the first ASIC 60 saturate, and the output of the second ASIC 62 is not between the first and second fault thresholds, $T_1$ and $T_2$, the software will latch an error fault. Similarly, if the output of first ASIC 60 falls below the second threshold $T_2$, the sensor is faulty and the software will latch an error fault.

Figure 13:
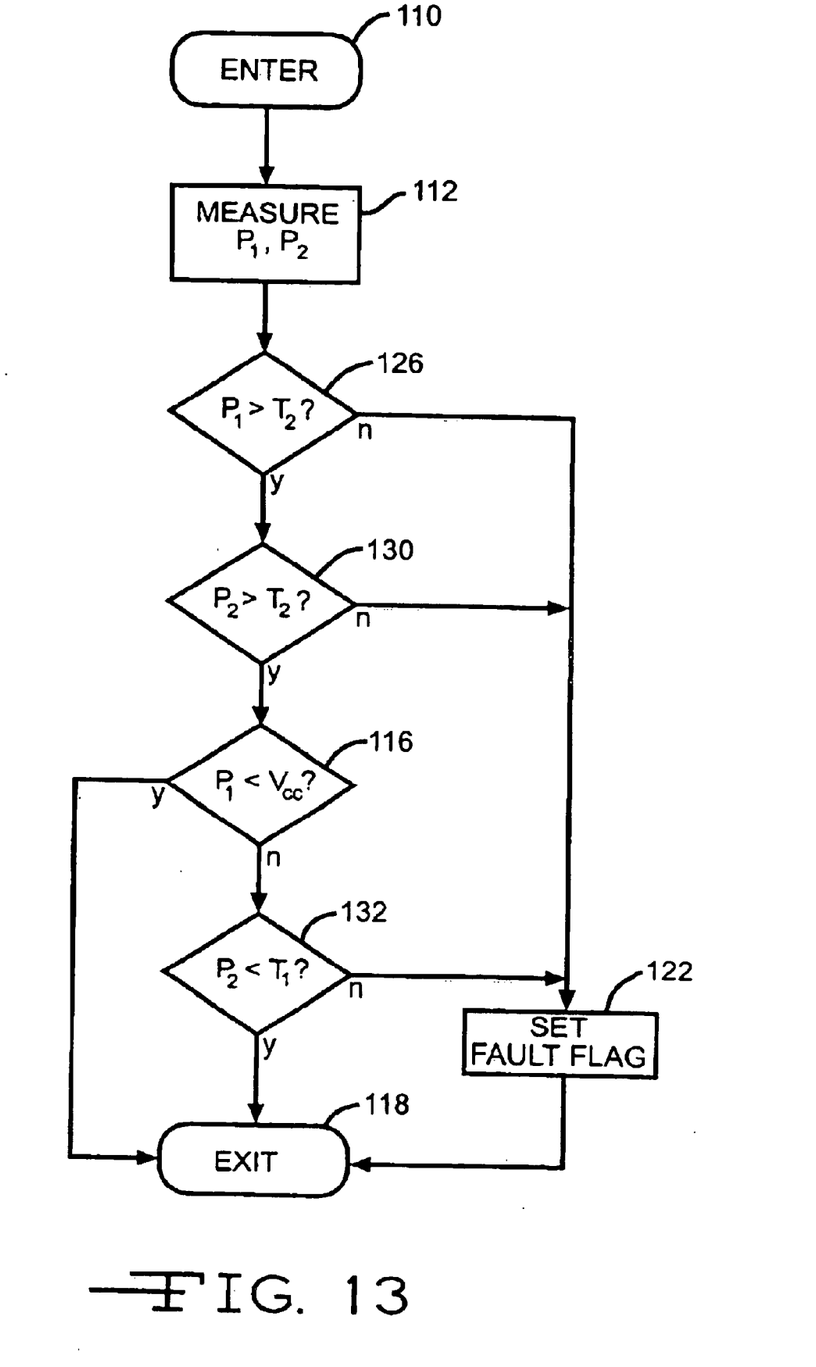
FIG. 13 is a flow chart for an alternate embodiment of the method for failure detection shown in FIG. 10.

The alternate embodiment of the technique would be implemented by a subroutine that is illustrated by the flow chart shown in FIG. 13. Blocks in FIG. 13 that are the same as blocks shown in FIG. 10 have the same numerical identifier. The subroutine proceeds through functional block 112 to the first decision block 126 where $P_1$ is compared to the second threshold, $T_2$. If $P_1$ is less than, or equal to, $T_2$, the subroutine transfers to functional block 122 and the fault flag is set. If $P_1$ is greater than $T_2$, the subroutine transfers to decision block 130 where $P_2$ is compared to the second threshold $T_2$. If $P_2$ is less than, or equal to, the second threshold $T_2$, the subroutine transfers to functional block 122 where the fault flag is set and then exits through block 118. If $P_2$ is greater than the second threshold $T_2$, the subroutine transfers to decision block 116 where $P_1$ is compared to $V_{cc}$. If the output $P_1$ is less than the saturation voltage $V_{cc}$, the subroutine returns to the main algorithm through the exit block 118. Thus, the first three decision blocks, 126, 130 and 116, provide absolute tests for the pressures $P_1$ and $P_2$. If, in the decision block 116, the output $P_1$ is greater than, or equal to, the saturation voltage $V_{cc}$, the subroutine continues to decision block 132 where $P_2$ is compared to the first fault threshold $T_1$. If $P_2$ is greater than, or equal to, the first threshold $T_1$, subroutine transfers to functional block 122 where the fault flag is set and then exits through block 118. If $P_2$ is less than the first threshold $T_1$, the program exits through block 118.

Figure 14:
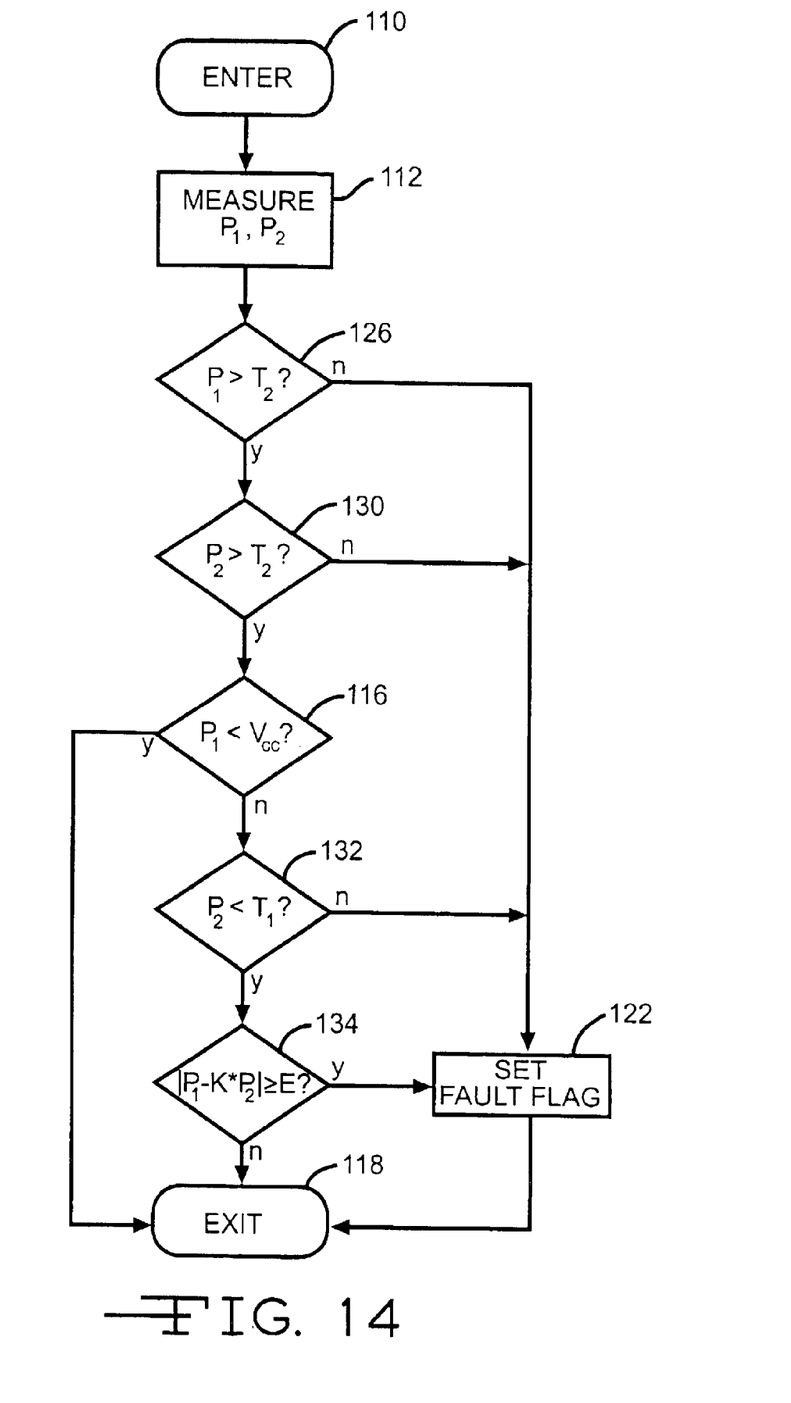
FIG. 14 is a flow chart for another alternate embodiment of the method for failure detection shown in FIG. 10.

The invention further contemplates another embodiment that includes, in addition to the above, comparing the outputs of the two sensor ASIC's to an error value, E. The alternate embodiment is illustrated by the flow chart shown in FIG. 14 where the blocks that are the same as the blocks in FIGS. 10 and 13 have the same numerical designators. The algorithm proceeds as above until it reaches the fourth decision block 132. In decision block 132, if $P_2$ is less than $T_2$, the algorithm transfers to a fifth decision block 134 where the absolute value of the difference between $P_1$ and $K*P_2$ is compared to the error value E. It will be noted that $P_1$ and $P_2$ are voltage levels at the outputs of the pressure sensors. In the preferred embodiment, the constant K is the reciprocal of the fractional multiplier of the gain of the second ASIC 62; however, other values may be utilized for K. Thus, for the example described above, in the preferred embodiment, K would be equal to three. If the difference in decision block 134 is greater than, or equal to, the error E, the subroutine transfers to functional block 122 where the fault flag is set and then exits through block 118. If the difference in decision block 134 is less than the error E, the subroutine transfers directly to exit block 118 to return to the main algorithm.

While the preferred embodiments of the technique for detecting the difference between an overpressure condition and sensor element failure has been illustrated and described for the configuration shown in FIG. 4, it will be appreciated that the technique also can be utilized with other configurations. Accordingly, the technique also can be applied to the pressure sensor configurations shown in FIGS. 6 and 7 and other dual output pressure sensor configurations not shown in the application. Additionally, while ASIC's have been shown for processing the output signals from the sensor elements, it will be appreciated that the invention also allows the use of less expensive commercially available signal processing electronic components that are not specifically designed for the circuit. Furthermore, while the preferred embodiment of the invention has been illustrated and described for a positive gain pressure sensor, it will be appreciated that the invention also may be practiced with negative gain devices that have an output that is inversely proportional to the pressure. Such devices reach ground potential for maximum pressure.

Figure 15:
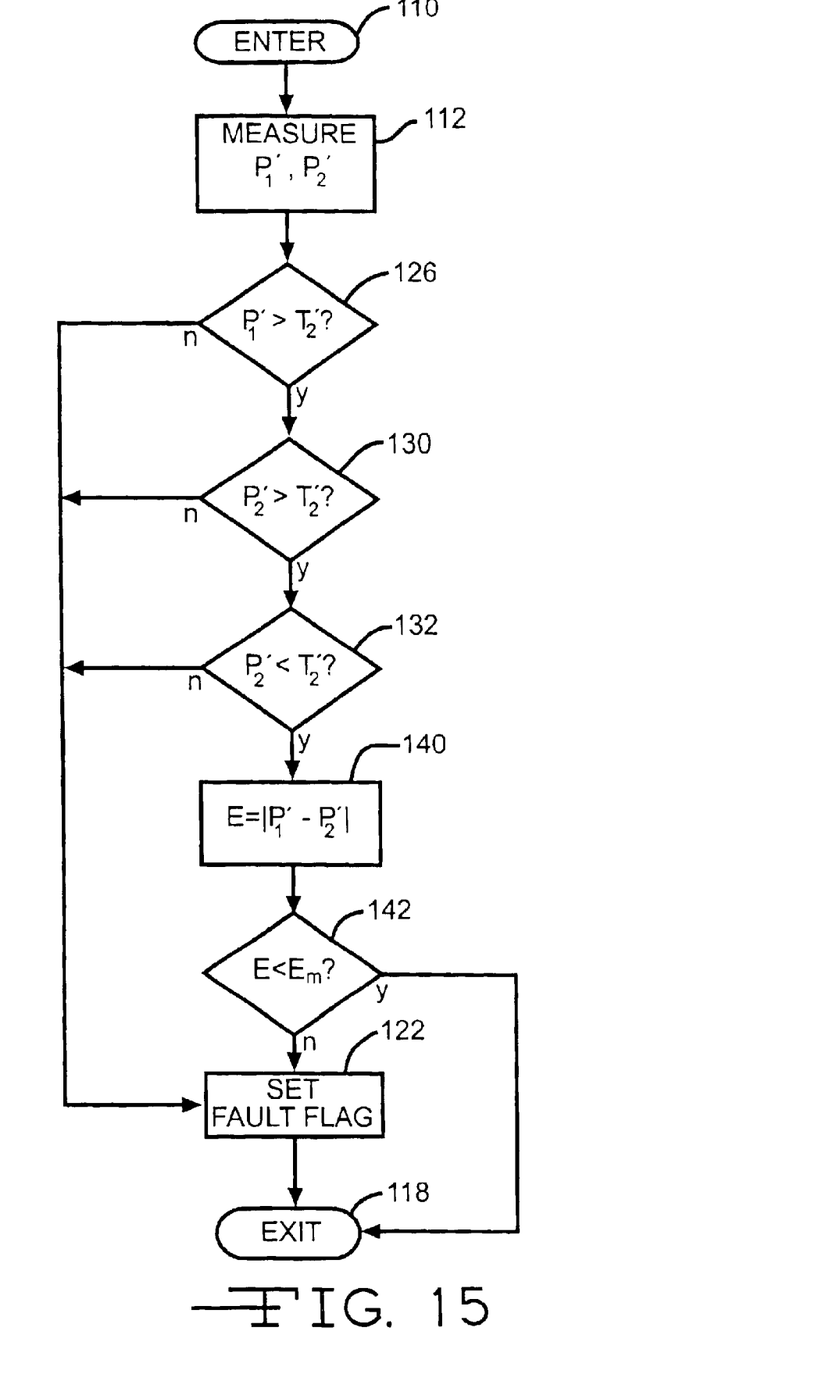
FIG. 15 is a flow chart for an alternate method for failure detection of the pressure sensor shown in FIG. 4.

Another alternate embodiment of the invention is illustrated in FIG. 15 where blocks that are similar to blocks shown in the preceding figures have the same numerical designators. As before, pressures $P_1'$ and $P_2'$ are measured in functional block, however, the pressures represent the pressure signals that have been processed by the microprocessor in the ECU. The values $P_1'$ and $P_2'$ include the tolerances of the sensors as follows:

$$P_1'=P_1 \pm P_{tolerance1}; \text{ and}$$

$$P_2'=P_2 \pm P_{tolerence2}.$$

Note that there is no fractional gain involved in this embodiment. Also, the threshold levels indicated in FIG. 15 as $T_1'$ and $T_2'$ correspond to the processed pressure values. The subroutine then continues through the absolute pressure checks described above to functional block 140 where an absolute value of error, E, is calculated as:

$$E=|P_1'-P_2'|.$$

The subroutine then transfers to decision block 142 where the error E is compared a maximum allowable error, $E_m$. The maximum allowable error $E_m$ is a function of the sensor tolerances and circuit component errors, to include an analog to digital conversion error. In the preferred embodiment, the maximum allowable error is given by the following formula:

$$E_m=[(P_{tolerance1}+P_{tolerance2})/P_{max}]*100 \text{ plus percentage circuit error}.$$

In the preferred embodiment, four percent is used for the percentage circuit error; however, other figures also can be used.

If the error E is less than the maximum allowable error, $E_m$, the subroutine returns to the main algorithm through the exit block 118. If the error E is equal to, or greater than, the maximum allowable error, $E_m$, the subroutine transfers to functional block 122 where the error flag is set and then exits through block 118 to the main algorithm.

While the preferred embodiment of the invention has been illustrated and described with a pressure sensor that included ASIC's, it will be appreciated that the invention also can be practiced with the ASIC's mounted externally from the pressure sensor. For example, the ASIC's could be included in the ECU. Similarly, while the preferred embodiment has been illustrated and described as utilizing an ECU microprocessor to compare pressure sensor data, it will be appreciated that other electrical components can be utilized to compare the signals. For example, the invention also can be practiced with an active electronic device, such as, for example, a comparator circuit, substituted for the microprocessor. Furthermore, the active electronic device or the microprocessor also could be included within the pressure sensor housing in lieu of being included in the ECU. Additionally, while the preferred embodiment of the invention has been illustrated and described as being included in an ABS, it will be appreciated that the invention also can be practice with Traction Control (TC) and/or Vehicle Stability Control (VSC) systems. It will also be appreciated that the flow charts shown are exemplary and that the invention can be practiced with different combinations of the illustrated tests. Additionally, some of the specific tests can be omitted. For example, the invention can be practiced without comparing the pressures $P_1$ and $P_2$ to the second fault threshold $T_2$.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for measuring a pressure comprising:
   (a) providing a pressure sensor having first and second sensor elements, the first and second sensor elements connected to corresponding first and second signal conditioning circuits, the second signal conditioning circuit having a gain that is a fraction of the gain of the first signal conditioning circuit;
   (b) comparing the output of the first signal conditioning circuit to a first threshold;
   (c) upon the output of the first signal conditioning circuit exceeding the first threshold, comparing the output of the second signal conditioning circuit to a second threshold; and
   (d) upon the output of the second signal conditioning circuit exceeding the second threshold, setting an error flag.

2. The method according to claim 1 wherein the first threshold is a saturation voltage for the first signal conditioning circuit.

3. The method according to claim 2 wherein the second threshold is equal to the first threshold.

4. The method according to claim 2 wherein the second threshold is less than the first threshold.

5. A method for measuring a pressure comprising:
   (a) providing a pressure sensor having first and second sensor elements, the first and second sensor elements connected to corresponding first and second signal conditioning circuits, the first signal conditioning circuit having a first gain and the second signal conditioning circuit having a second gain that is a fraction of the gain of the first signal conditioning circuit;
   (b) comparing the output of the first signal conditioning circuit to a first threshold and, upon the output of the first signal conditioning circuit being less than or equal to the first threshold, setting an error flag;
   (c) upon the output of the first signal conditioning circuit exceeding the first threshold, comparing the output of the second signal conditioning circuit to the first threshold and upon the output of the second signal conditioning circuit being less than or equal to the first threshold, setting an error flag;
   (d) upon the output of the second signal conditioning circuit exceeding the first threshold, comparing the output of the first signal conditioning circuit to a second threshold; and
   (e) upon the output of the first signal conditioning circuit exceeding the second threshold, comparing the output of the second signal conditioning circuit to a third threshold and, upon the output of the second signal conditioning circuit exceeding the third threshold, setting an error flag.

6. The method according to claim 5 further including, subsequent to step (e), the following steps:
   (f) upon the output of the second signal conditioning circuit being between the first and third thresholds, determining an absolute value of the difference between the output of the first signal conditioning circuit and the product of a constant times the output of the second signal conditioning circuit;
   (g) comparing the difference between the outputs to an error value; and
   (h) upon the difference being greater than the error value, setting an error flag.

7. The method according to claim 6 wherein the multiplier constant for the output of the second signal conditioning circuit is a function of the gain of the second signal conditioning circuit.

8. The method according to claim 7 wherein the multiplier constant for the output of the second signal conditioning circuit is the reciprocal of the fractional reduction of the gain of the second signal conditioning circuit relative to the gain of the first signal conditioning circuit.

9. The method according to claim 1 wherein, prior to step(b), the output of the first signal conditioning circuit is compared to a third threshold that is less than the first and second thresholds and, upon the output of the first signal conditioning circuit being less than the third threshold, setting an error flag.

10. A method for measuring a pressure comprising:
    (a) providing a pressure sensor having first and second sensor elements;
    (b) determining an absolute value of the difference of the outputs of the first and second sensor elements;
    (c) comparing the absolute value of the difference of the outputs of the first and second sensor elements to a maximum difference factor; and
    (d) upon the absolute value of the difference of the outputs of the first and second sensor elements greater than the maximum difference factor, setting an error flag.

11. The method according to claim 10 wherein the outputs of the first and second pressure sensor elements include pressure sensor tolerances.

12. The method according to claim 11 wherein the maximum difference factor is a function of the pressure sensor tolerances and the circuit component errors.

13. The method according to claim 5 further including, subsequent to step (e), the following steps:
    (f) determining an absolute value of the difference of the outputs of the first and second sensor elements;
    (g) comparing the absolute value of the difference of the outputs of the first and second sensor elements to a maximum difference factor; and
    (h) upon the absolute value of the difference of the outputs of the first and second sensor elements being greater than the maximum difference factor, setting an error flag.

14. The method according to claim 13 wherein the outputs of the first and second pressure sensor elements include pressure sensor tolerances.

15. The method according to claim 14 wherein the maximum difference factor is a function of the pressure sensor tolerances and the circuit component errors.

16. A pressure sensor assembly for a hydraulic system comprising:
    a pressure sensor housing adapted to be mounted upon a hydraulic system;

a pressure sensor diaphragm carried by said pressure sensor housing;

a first pressure sensing element mounted upon said pressure sensor diaphragm;

a second pressure sensing element mounted upon said pressure sensor diaphragm;

a first signal conditioning circuit connected to said first pressure sensing element, said first signal conditioning circuit having a first gain and being operable to generate a first pressure signal at a first output port;

a second signal conditioning circuit connected to said second pressure sensing element, said second signal conditioning circuit having a second gain that is a fraction of said first signal conditioning gain, said second signal conditioning circuit being operable to generate a second pressure signal at a second output port; and an electronic device connected to said output ports of said first and second signal conditioning circuits, said electronic device being operative to compare said first pressure signal to a first threshold and said second pressure signal to a second threshold, said electronic device being further operative, upon both pressure signals exceeding both thresholds, to generate an error signal.

17. The pressure sensor assembly according to claim 16, wherein said second pressure threshold is equal to said first pressure threshold.

18. The pressure sensor assembly according to claim 17 wherein said electronic device is further operable to determine an absolute value of the difference between said first pressure signal and the product of a constant times said second pressure signal and further wherein said electronic device is also operable to compare said difference to an error value and, upon said difference exceeding said error value, to generate an error signal.

19. The pressure sensor assembly according to claim 18 wherein said first and second pressure signals include pressure sensor tolerances.

20. The pressure sensor assembly according to claim 19 wherein said error value is a function of the pressure sensor tolerances and the circuit component errors.

21. A pressure sensor assembly for a hydraulic system comprising:

a pressure sensor housing adapted to be mounted upon a hydraulic system;

a pressure sensor diaphragm carried by said pressure sensor housing;

a first pressure sensing element mounted upon said pressure sensor diaphragm;

a second pressure sensing element mounted upon said pressure sensor diaphragm;

a first signal conditioning circuit connected to said first pressure sensing element, said first signal conditioning circuit having a first gain and being operable to generate a first pressure signal at a first output port;

a second signal conditioning circuit connected to said second pressure sensing element, said second signal conditioning circuit having a second gain that is a fraction of said first signal conditioning gain, said second signal conditioning circuit being operable to generate a second pressure signal at a second output port; and an electronic device connected to said output ports of said first and second signal conditioning circuits, said electronic device being operative to compare said first and second pressure signals to a first threshold and, upon either of said first and second pressure signals being less than said first threshold, generating an error signal; said electronic device being further operable to compare said first pressure signal to a second threshold and said second pressure signal to a third threshold and, upon said first pressure signal exceeding said second threshold and said second pressure signal exceeding said third threshold, generating an error signal.

22. The pressure sensor assembly according to claim 21 wherein said second threshold is greater than said third threshold and further wherein said third threshold is greater than said first threshold.

23. The pressure sensor assembly according to claim 22 wherein said electronic device is further operable to determine an absolute value of the difference between said first pressure signal and the product of a multiplier constant times said second pressure signal and further wherein said electronic device is also operable to compare said difference to an error value and, upon said difference exceeding said error value, to generate an error signal.

24. The pressure sensor assembly according to claim 23 wherein said multiplier constant for said second pressure signal is a function of said second signal conditioning circuit gain.

25. The pressure sensor assembly according to claim 24 wherein said multiplier constant for said second pressure signal is the reciprocal of the fractional reduction of the gain of said second signal conditioning circuit relative to the gain of the first signal conditioning circuit.

26. A pressure sensor assembly for a hydraulic system comprising:

a pressure sensor housing adapted to be mounted upon a hydraulic system;

a pressure sensor diaphragm carried by said pressure sensor housing;

a first pressure sensing element mounted upon said pressure sensor diaphragm;

a second pressure sensing element mounted upon said pressure sensor diaphragm;

a first signal conditioning circuit connected to said first pressure sensing element, said first signal conditioning circuit having a first gain and being operable to generate a first pressure signal at a first output port;

a second signal conditioning circuit connected to said pressure sensing element, said second signal conditioning circuit having a second gain that is a fraction of said first signal conditioning gain, said second signal conditioning circuit being operable to generate a second pressure signal at a second output port; and an electronic device connected to said output ports of said first and second signal conditioning circuits, said electronic device being operative to compare said first and second pressure signals to a first threshold and, upon either of said first and second pressure signals being less than said first threshold, generating an error signal, said electronic device being further operable to determine an absolute value of the difference between said first pressure signal and said second pressure signal and further wherein said electronic controller is also operable to compare said difference to an error value and, upon said difference exceeding said error value, to generate an error signal.

27. The pressure sensor assembly according to claim 26 wherein the outputs of the first and second pressure sensor elements include pressure sensor tolerances.

28. The pressure sensor assembly according to claim 27 wherein the maximum difference factor is a function of the pressure sensor tolerances and the circuit component errors.

* * * * *